Aug. 24, 1965   T. A. COFFEE   3,202,934
CATHODE-RAY EXCITED LASER GENERATOR
Filed Dec. 29, 1961   3 Sheets-Sheet 2

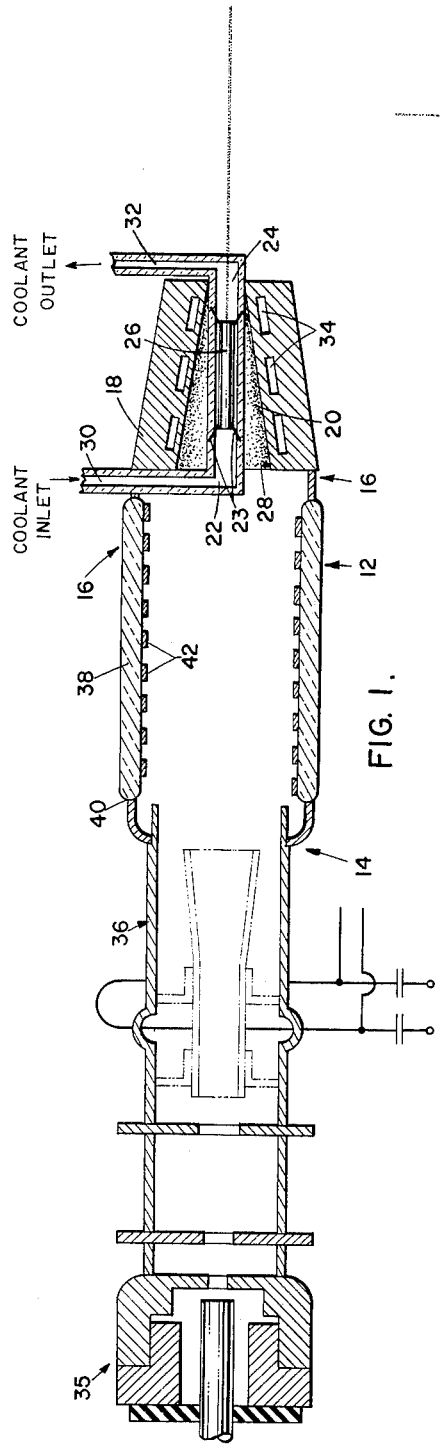

Thomas A. Coffee
INVENTOR.

BY

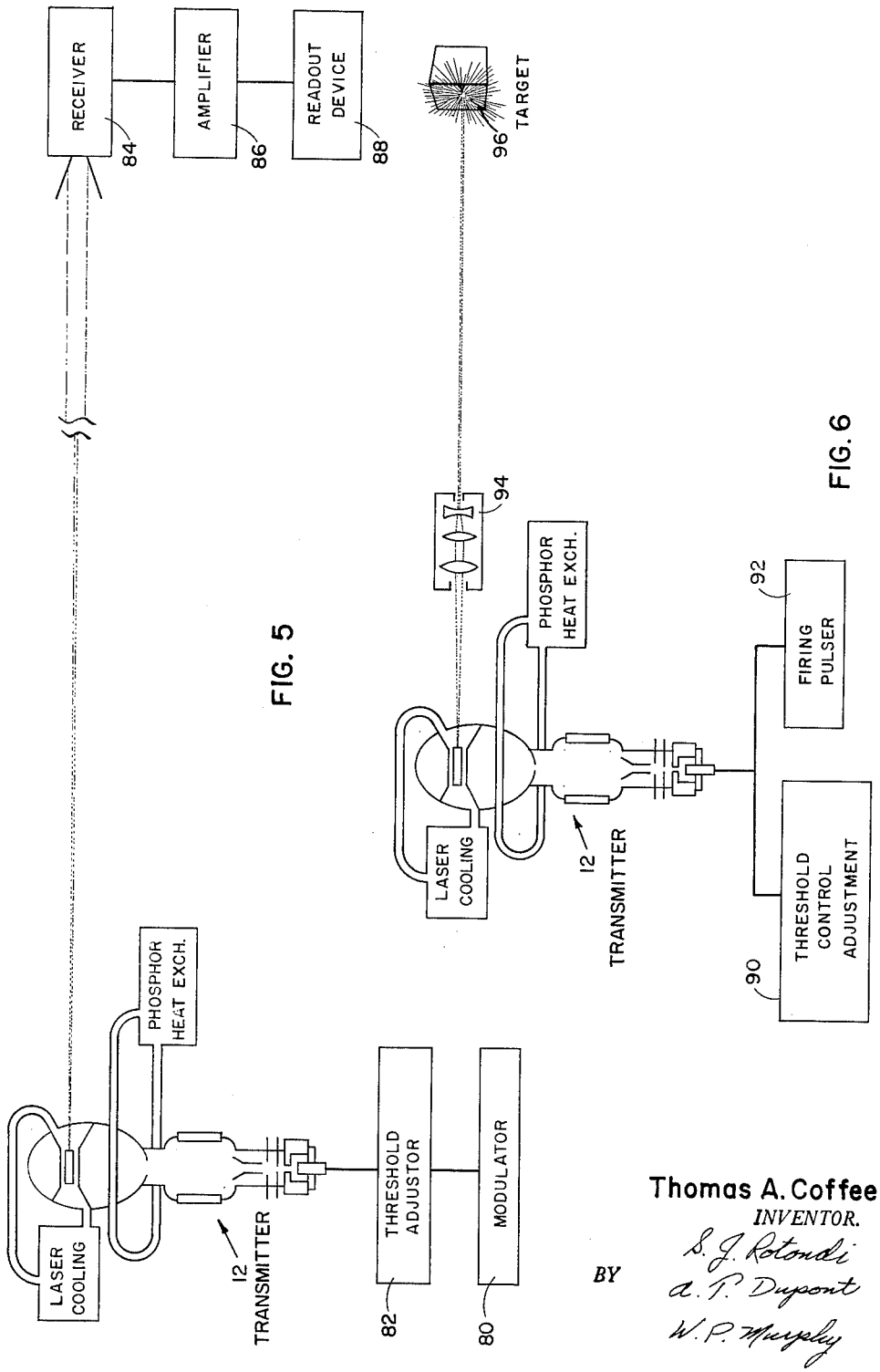

United States Patent Office 3,202,934
Patented Aug. 24, 1965

3,202,934
CATHODE-RAY EXCITED LASER
GENERATOR
Thomas A. Coffee, 745 Del Monte, Las Cruces, N. Mex.
Filed Dec. 29, 1961, Ser. No. 163,364
11 Claims. (Cl. 331—94.5)
(Granted under Title 35, U.S. Code (1952), sec. 266)

The invention described herein may be manufactured and used by or for the Government for governmental purposes without the payment of any royalty thereon.

This application pertains to light amplification by stimulated emission of radiation. Apparatus for such amplification is now generally described as a laser.

Generally speaking, lasers may be defined as devices for application of excitation energy thereto to provide differential levels of energy in portions of the device for generation and amplification of light.

One characteristics of a laser is that it includes a medium in which atoms can exist in a series of discrete energy levels. When radiant energy of the critical frequency is applied to the medium, portions of the atoms are excited and raised to higher energy levels. The excited atoms may then radiate energy spontaneously, emitting photons and reverting to the ground state. Also during the excitation period the atoms may be stimulated to emit photons by being struck by outside photons. Thus, in addition to the stimulating photons, additional photons of the same wavelength are produced.

In an atom the transistion between energy levels is accomplished by energy absorption when going to the higher level and energy emission when going to the lower state. One method of such application to apply excitation energy is by radiation interaction. The energy change of the transition $\Delta E = h\nu$, where $h$ is Planck's constant and $\nu$ is the frequency of the radiation absorbed or emitted.

Therefore, if the medium be irradiated at a frequency critical to the difference in the energy levels of the medium more power of the critical frequency will be radiated than is absorbed to provide a coherent light output.

The problem in laser development is to provide an "active medium" of which optimum portions can be placed in an excited state so that when activated at discrete frequency or "pumped," a cascade of photons will be emitted. For a system to be pumped to cause emission of the photons from the active medium an excess of excited atoms is required in the medium to enable a stimulated emission to predominate over absorption.

In the present application a crystal such as a ruby is selected as the active medium because it has at least three energy levels unequally spaced. Ruby is aluminum oxide in which a few of the aluminum atoms have been replaced by chromium atoms. The chromium atoms in the crystal will absorb light and the light that is absorbed raises the atoms to an excited state. The excited atoms may give up some of its energy to the crystal lattice and land temporarily in a metastable state. If not subjected to stimulation they drop at random to the ground state. The first few photons emitted by the atoms in their drop from the metastable to ground state stimulate the still excited chromium atoms to give up photons and tumble to the ground state.

Calcium flouride including samarium particles may also be used as the active medium.

In the present invention pumping is accomplished by bombarding with electrons an activating material, such as a phosphor and causing the phosphor to energize a ruby crystal mounted in close proximity of the bombarded phosphor and raise most of the atoms of the ruby from the ground state to the excited or higher energy state.

The ruby is machined to form a rod about four centimeters long and half a centimeter in diameter. The ends of the rod are polished to provide optically flat parallel surfaces and both surfaces are silvered. A substantially central aperture of substantially 2% of the area is provided through the silver coating at one end and the rod is irradiated by a phosphor to provide the pumping for the photon emission.

Photons traveling in directions substantially parallel to the prime axis of the rod are reflected back and forth between the silvered surfaces to constitute a concentration of photons passing through the aperture in substantially a single direction to provide an intense light beam.

Such a device provides new apparatus for communication both within the atmosphere and in areas of outer space. The laser can be incorporated in a superior type of apparatus similar to radar which may be a "lidar" and includes apparatus to direct the concentrated beam and pin point a target. Such a beam is reflected and the apparatus includes a mechanism to detect the reflected beam and provide a picture of the target having a clarity never before attained. The term "lidar" is coined from the phrase, light detecting and ranging.

Several other applications of the laser can be included in telemetry relays, timing distributions, air to ground data transmissions, etc. The laser's power also can be focused to produce intense heating in a target.

An object of the present invention is to provide a novel means for generation, amplification, and modulation of coherent light.

Another object of the present invention is to provide a structure capable of efficiently producing light at selected frequencies.

In one embodiment of the present invention a cathode ray tube device incloses a laser rod positioned in a cavity provided in a heat conducting material. A phosphur is applied to the inner walls of the cavity to be bombarded by electrons and so irradiate the ruby at a critical frequency range referred to as its acceptance band. Means is provided within the cathrode ray tube to dissipate the heat generated by both the phosphor and the rod.

Another embodiment of the present invention provides a housing having an ellipsoidal cavity. The housing is provided with a source of electronic emission in the direction of the focal points of the housing. A ruby rod is positioned at one of the focal points and a conduit is disposed at its other focal point to permit flow of a liquid phosphor. The liquid phosphor is bombarded by electrons to irradiate the ruby rod.

Another embodiment of the invention is similar to the second embodiment except that the housing is provided with a cylindrical cavity for enclosing the ruby rod and the liquid phosphor.

The principles of the present invention will be better understood from the following detailed discussion taken in conjunction with the accompanying drawings in which:

FIGURE 1, an elevational view partially in section, showing the heat sink and ruby rod mounted therein.

FIGURE 2 is a view similar to FIGURE 1 illustrating another embodiment of the present invention wherein the housing is provided with an ellipsoidal cavity enclosing the ruby rod and a liquid phosphor.

FIGURE 5 is a schematic diagram of a communications system illustratively embodying aspects of the principles of the present invention.

FIGURE 6 is a schematic diagram of a weapons system illustratively embodying aspects of the principles of the present invention.

Figure 3:
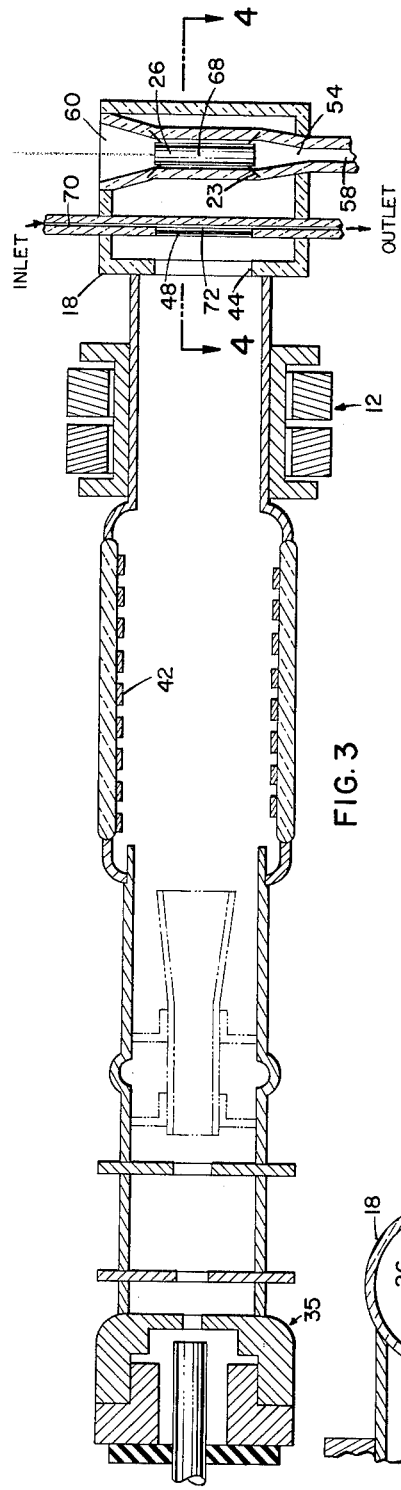
FIGURE 3 is a view similar to FIGURE 2 illustrating still another embodiment of the present invention wherein the housing is provided with a cylindrical cavity enclosing the ruby rod and liquid phosphor.
Figure 4:
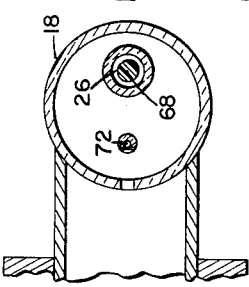
FIGURE 4 is a view along line 4—4 of FIGURE 3.

Referring now to FIGURE 1, a laser generally designated by the numeral 12, includes a cathode ray device 14. A forward portion 16 of device 14 includes a housing 18 of heat conducting material having a conical hole or cavity 20 cut transversely therethrough.

A transparent conduit 22 is positioned within hole 20 and sealed to the heat sink at the point where it extends through the lesser periphery 24 of hole 20. The conduit serves as a means to mount a ruby rod, or other appropriate laser material 26 within cavity 20. Rod 26 is secured in conduit 22 by means of a plurality of stainless steel wires 23 which are fused to the rod and conduit 22.

The inner wall of cavity 20 is coated with a high energy phosphor 28, chosen for its ability to emit, when bombarded by electrons, a band of frequencies closely matching the acceptance band of the laser.

To carry away the heat generated by the ruby rod, there is provided inlet and outlet tubes 30 and 32, respectively. Tubes 30 and 32 are disposed in communication with conduit 22 and a coolant storage or heat exchanger (not shown). A coolant passes through inlet 30 through conduit 22 and around rod 26 and out through tube 32. Conduits 30 and 32 are vacuum sealed at the points where they protrude through device 14.

To carry away the heat generated by the bombarded phosphors, the heat sink is provided with a plurality of cooling ducts 34 positioned around cavity 20 in a manner which will afford cooling jacket circulation. Ducts 34 are disposed in communication with a coolant storage or heat exchanger (not shown).

The surface of cavity 20 may be silvered to reflect the emitted phosphor radiation back to the ruby rod.

The cathode ray device 14 may be provided with either a Phillips-dispenser type cathode (10a./cm.$^2$) or a tungsten hairpin cathode. Focusing magnets 44 shown in FIGURE 2, as used in nuclear particle accelerators may be utilized if desired. The body 36 of cathode ray device 14 is preferably made of stainless steel and houses the electron gun and electrostatic deflection plates, if used. The forward portion 16 includes a glass sealing metal alloy and a glass cylinder 38 is sealed to this alloy at 40. Cylinder 38 has scribed on its inner wall a graphite post deflection accelerating spiral 42. Spiral 42 has an overall resistance of 2 to 5 megohms. A post deflection acceleration voltage is applied across this spiral to create a uniform field gradient over most of the post deflection region.

Body 36 contains the anode, limiting aperture disk, and deflection plates. The control grid and cathode are disposed at the rearward end 35 of housing 36.

In operation the cathode ray device 14 is energized and the electrons emitted by the cathode are focused into the phosphor. The electrons strike the phosphor and cause emission of photon energy mostly within the absorptivity band (5150 to 5850 A. for ruby). Photon energy enters the ruby rod to excite the atoms of the ruby to the required level. The phosphor is selected to match the absorptivity band of the crystal used. After being excited by irradiation by the bombarded phosphor, the excited ruby atom spontaneously emits a photon substantially parallel to its longitudinal axis. (Photons emitted in other directions pass out of the crystal.) The photon stimulates another atom to emit a photon and this process continues as the photons are reflected back and forth between the ends of the ruby rod.

However, as the ruby violently pulses, it heats appreciably. To maintain normal operating temperatures, a coolant, such as water is passed around the ruby rod. Cryogenic cooling agents can be used where continuous operation is anticipated.

Another embodiment of my invention is shown in FIGURE 2 where elements corresponding to those shown in FIGURE 1 are identified by like reference numerals. The essential difference between the embodiments shown in FIGURES 1 and 2 is that the forward portion 16 of cathode ray device 12 is provided with a housing 18, ellipsoidal in configuration, and in which the ruby rod 26 is mounted substantially perpendicular to the electron flow.

The housing 18 is secured to the forward portion 16 of cathode ray device 14. A glass conduit 46 is mounted in housing 18 and passes through a focal point 50 of the ellipsoid. Conduit 46 is vacuum sealed to housing 18 and connects to a heat exchanger (not shown). A liquid phosphor, under high pressure is circulated through conduit 46 and the heat exchanger.

An electron permeable foil window 48 such as titanium, aluminum or nickel is mounted in conduit 46 in line with an opening 51 at one end 52 of the housing.

A laser material or ruby rod 26 is mounted in an aperture 54 at the other focal point 56 of the ellipsoidal housing. An inlet and an outlet passage 58 and 60, respectively, communicate with aperture 54 and may be disposed in communication with a heat exchanger or coolant storage device (not shown).

Cooling may be accomplished by forced draft convention cooling or cryogenic cooling (such as liquid nitrogen), if desired.

In operation the electrons pass through opening 51 of housing 18 and through the permeable foil window 48 to penetrate the fast moving phosphor. Approximately 85% electron penetration is achieved and since most of the electron energy is absorbed as heat the phosphor is kept circulating through a heat exchanger for cooling.

That part of the phosphor converted to light energy is transmitted as photons throughout the ellipsoidal housing to be focused to the ruby rod 26 disposed at the focal point 56 of housing 18. The housing is preferably made of crown glass.

Ruby rod 26 is mounted in aperture 54 by means of a plurality of stainless steel wires 23. Wires 23 are fused to rod 26 and housing 18 adjacent aperture 54.

Focusing magnets 45 may be provided to insure uniform magnetic gradients in both transverse coordinates. The pole faces are shaped to a rectangular hyperbola and the resultant exit beam is a highly concentrated cusp spot.

Further embodiment of my invention is shown in FIGURE 3 where elements corresponding to those shown in FIGURES 1 and 2 are identified by like reference numerals. The essential differences in the embodiments shown in FIGURES 1 and 2 and the embodiment of FIGURE 3 is that the housing is cylindrical in configuration.

As shown in FIGURE 3, the forward portion of cathode ray device 14 is provided with a housing 18, cylindrical in configuration.

Laser material or rod 26 is secured in housing 18 at focal axis 68. The rod is mounted in the housing so that its longitudinal axis is parallel to the longitudinal axis of the cylindrical housing. A conduit 70 mounted at the other focal axis 72 of housing 18 and is disposed in communication with a source of liquid phosphor for circulation through conduit 70. Conduit 70 is further provided with a permeable foil window 48 for passage therethrough of the electrons.

An opening 44 is provided in housing 18 adjacent the conduit 70 and is substantially equal in length to rod 26.

Operation of this embodiment is essentially the same as set forth in the embodiments of FIGURES 1 and 2.

FIGURE 5 illustrates a communication system with a laser incorporated therein. The transmission system includes a modulator 80, which may be analog or digital, a threshold adjustor 82 and the laser transmitter 12.

Digital or coded pulse type of modulation may be accomplished by simple intensity modulation of the electron gun output. When a signal is to be transmitted, it is applied to the electron gun and the output of the cathode ray gun is raised to an intensity sufficient to produce a pumping light of an intensity which is in excess of that required to excite the ruby rod. The laser, therefore, produces the desired output pulse. Since exceeding the required excitation pumping light power by different values produces distinguishable differences in the laser's output pulses, different types of reference markers may be transmitted in conjunction with the pulse coded information.

The receiving system for the coherent light beams include a photomultiplier tube 84, amplifier 86 and readout device 88, such as an oscilloscope, tape or audio detector.

Coherent light is received by receiver 84 and amplified in amplifier 86 and then transmitted to readout device 88.

In FIGURE 6 there is illustrated a weapon system with the laser incorporated therein. The weapon system includes the laser 12, a threshold control adjustor 90, a firing pulser 92, and a collimator or focus adjustor 94.

The threshold adjustor 90 controls the intensity of electron flow to the phosphor and consequently, the intensity of the beam emitted by laser 12, and the firing pulser 92 causes the beam to be intermittently emitted. Collimator 94 focuses the beam to a target 96.

Figure 7:
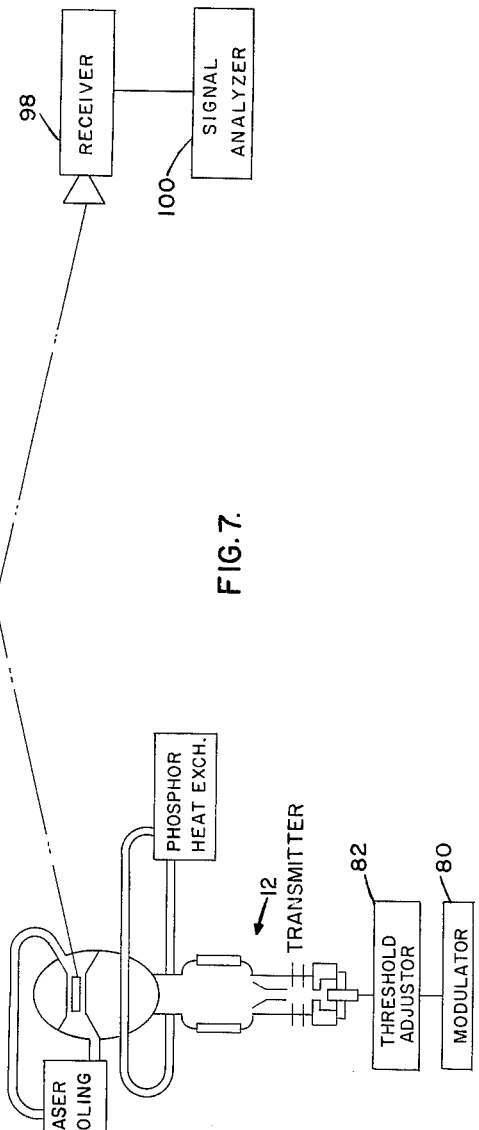
FIGURE 7 is a schematic diagram of a "lidar" system illustratively embodying the principles of the present invention.

In FIGURE 7 there is illustrated a "lidar" (light detecting and ranging) system. The "lidar" system includes the laser transmitter 12, modulator 80 and threshold adjustor 82.

The concentrated beam is directed to a target 96 to be reflected to a receiver 98 (such as a photomultiplier tube). Responsive to receiving the reflected beam receiver 98 is disposed to transmit signals to a signal analyzer 100 to provide therein an image of the target.

It is to be understood that various specific embodiments disclosed are merely illustrative of the general principles of the invention and that various modifications may be resorted to that is within the spirit and scope of the appended claims.

I claim:

1. A device disposed for generation, amplification, modulation and propagation of a concentrated beam of substantially coherent light comprising:
   (a) a cathode ray tube disposed for producing a stream of electrons;
   (b) a housing secured to the forward end of said cathode ray tube and provided with an elliposidal cavity;
   (c) phosphor pumping means mounted at one of the foci of said ellipsoidal cavity and disposed for bombardment by said electrons for production of a light output;
   (d) a medium mounted at the other foci of said ellipsodial housing and disposed for excitation by said light output and consequent energization at multiple levels for emission of a concentrated beam of coherent light responsive to differences in said levels of energization.

2. A device as in claim 1 with a conduit disposed at said focus for enclosing said pumping means in communication with a cooling apparatus.

3. A device as in claim 2 with said medium mounted in and aperture provided in said housing; means disposed in communication with said aperture for cooling said medium.

4. A device as in claim 3 with said conduit provided with an electron permeable foil window for passage therethrough of electrons.

5. A device as in claim 4 with;
   (a) apparatus disposed for circulation of coolant therein and in communication with said medium to withdraw heat therefrom and,
   (b) with said pumping means comprising a liquid phosphor for the circulation of said coolant.

6. A device as in claim 5 with said medium comprising a chromium-doped ruby crystal.

7. A device disposed for generation, amplification, modulation and propagation of a concentrated beam of substantially coherent light comprising:
   (a) a cathode ray tube disposed for producing a stream of electrons;
   (b) a housing secured to the forward end of said cathode ray tube, said housing provided with a cylindrical cavity, and an aperture on the periphery of said housing for passage of said electron flow therethrough;
   (c) a phosphor pumping means disposed in said cavity for bombardment by said electrons for producing a light output;
   (d) a medium mounted in said cavity for excitation by said pumping means and consequent energization at multiple levels for emission of coherent light responsive to the differences in said levels.

8. A device as in claim 7 with said medium comprising a chromium-doped ruby crystal.

9. A device as in claim 8 including a conduit secured in said housing and disposed in communication with a heat exchanger; said phosphor pumping means comprising a liquid phosphor for circulation through said conduit and heat exchanger.

10. A device for generation, amplification, modulation and propagation of a concentrated beam of substantially coherent light comprising:
    (a) a cathode ray tube disposed for producing a stream of electrons;
    (b) a housing secured to the forward end of said cathode ray tube, said housing provided with a conical cavity disposed in communication with said cathode ray tube, said conical cavity having its axis coincident with the longitudinal axis of said cathode ray tube;
    (c) a phosphor pumping means disposed on the inner wall of said cavity for bombardment by said electrons for producing a light output;
    (d) a medium mounted in said housing in coaxial alignment with the axis of said cavity, said medium disposed for excitation by said pumping means and consequent energization at multiple levels for emission of coherent light responsive to the differences in said levels,
    (e) means disposed in communication with said medium to carry away heat generated therein as a result of the energization of said medium.

11. A device as in claim 10 with said medium comprising a chromium-doped ruby crystal.

References Cited by the Examiner

UNITED STATES PATENTS

| 2,929,922 | 3/60 | Schawlow et al. | 325—105 |
| 2,970,310 | 1/61 | Bruce | 340—366 |
| 2,999,163 | 9/61 | Beese | 250—199 |

OTHER REFERENCES

Bloom: Optical Pumping, Scientific American, vol. 203, No. 4, October 1960, pp. 72–80.

Darrow Article, Journal of The Optical Society of America, vol. 8, No. 5, May 1924, pp. 691–692.

Mann: Popular Science, October 1960, pp. 25, 26.

Olt: Crystals for Microwave and Optical Masers, Electronics, vol. 34, No. 18, May 5, 1961, pp. 88, 90 and 91.

Stitch et al.: Optical Ranging System Uses Laser Transmitter, Electronics, Apr. 21, 1961, pp. 51–53.

Vogel et al.: Lasers: Devices and Systems—Part I, Electronics, vol. 34, No. 43, October 27, 1961, pp. 39–47.

Wick et al.: Journal Optical Society America, vol. 18, No. 5, May 1929, pp. 383–392.

Wieder: Review of Scientific Instruments, vol. 30, No. 11, November 1959, pp. 995, 996.

DAVID G. REDINBAUGH, *Primary Examiner.*